United States Patent
Abadi et al.

(10) Patent No.: US 10,789,067 B2
(45) Date of Patent: Sep. 29, 2020

(54) SYSTEM AND METHOD FOR IDENTIFYING OPEN SOURCE USAGE

(71) Applicant: WHITESOURCE LTD., Bnei Brak (IL)

(72) Inventors: Aharon Abadi, Bnei Brak (IL); Doron Cohen, Bnei Brak (IL); Rami Sass, Bnei Brak (IL)

(73) Assignee: WHITESOURCE LTD., Bnei Brak (IL)

(*) Notice: Subject to any disclaimer, the term of this patent is extended or adjusted under 35 U.S.C. 154(b) by 149 days.

(21) Appl. No.: 16/180,126

(22) Filed: Nov. 5, 2018

(65) Prior Publication Data

US 2020/0142692 A1    May 7, 2020

(51) Int. Cl.
G06F 9/44 (2018.01)
G06F 8/75 (2018.01)
G06F 16/903 (2019.01)
G06F 16/901 (2019.01)

(52) U.S. Cl.
CPC ............ *G06F 8/751* (2013.01); *G06F 16/903* (2019.01); *G06F 16/9014* (2019.01)

(58) Field of Classification Search
None
See application file for complete search history.

(56) References Cited

U.S. PATENT DOCUMENTS

| | | | |
|---|---|---|---|
| 2010/0242028 A1* | 9/2010 | Weigert | G06F 21/105 717/131 |
| 2019/0079754 A1* | 3/2019 | Makkar | G06F 8/71 |
| 2019/0087550 A1* | 3/2019 | Kim | G06F 8/71 |
| 2020/0097283 A1* | 3/2020 | Coccia | G06F 8/72 |

* cited by examiner

*Primary Examiner* — Qamrun Nahar
(74) *Attorney, Agent, or Firm* — The Roy Gross Law Firm, LLC; Roy Gross

(57) ABSTRACT

A method, system and computer program product, the method comprising: obtaining one or more source files to be examined for open source usage; extracting partial representation of a source file from the source files; creating fingerprints from the partial representation; encoding the fingerprints into characteristics; issuing a query to a database for retrieving from an open source and characteristics index one or more open source files associated with the characteristics; receiving a response including the retrieved open source file; checking whether the source file comprises a snippet from the open source file; and subject to the source file comprising the snippet, outputting an identification of the open source file.

20 Claims, 2 Drawing Sheets

SYSTEM AND METHOD FOR IDENTIFYING OPEN SOURCE USAGE

TECHNICAL FIELD

Figure 1:
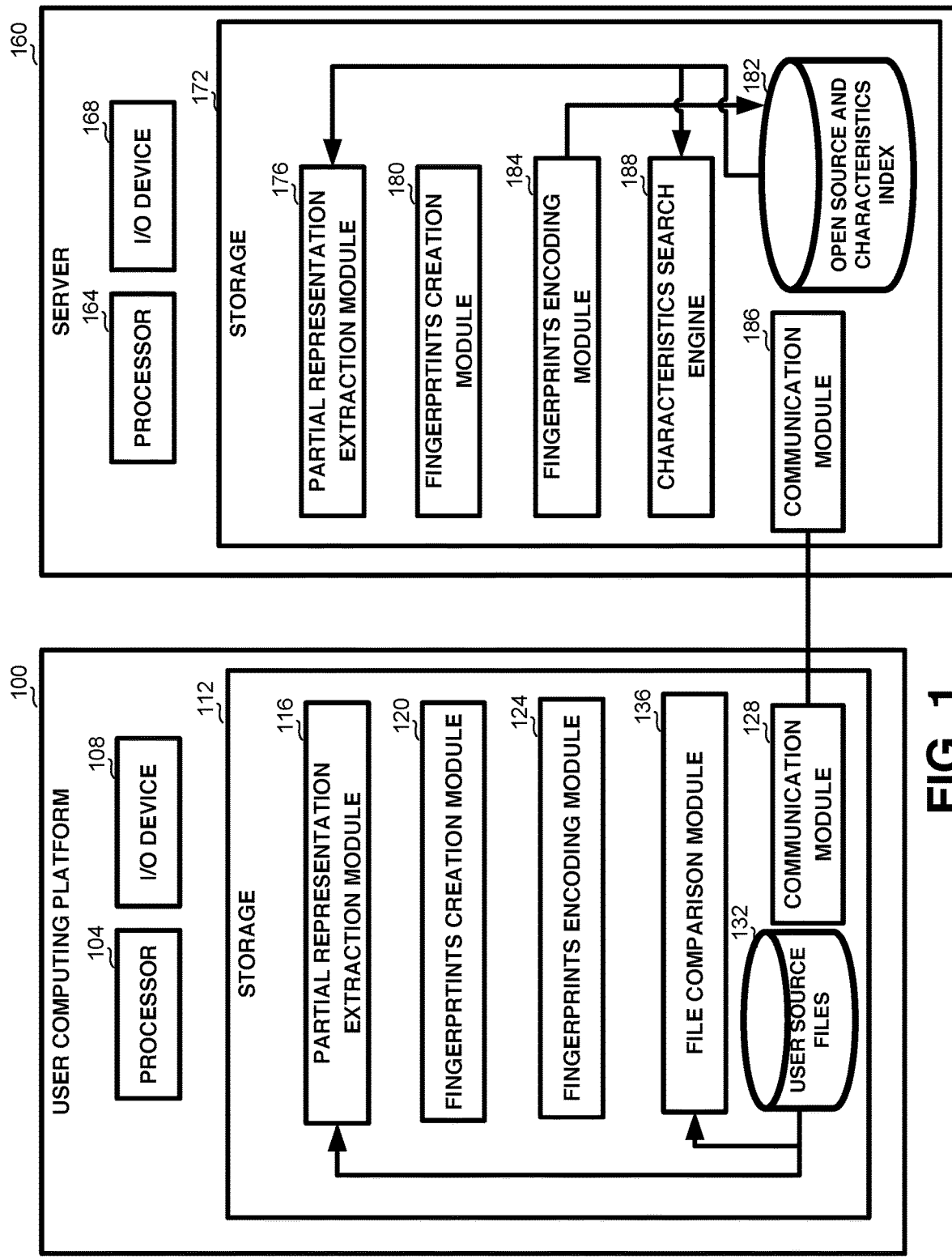

The present disclosure relates to open source in general, and to a system and apparatus for checking whether and which open source is used in source files, in particular.

BACKGROUND

Open source relates to computer code that is publicly available and may be freely accessed and used by programmers in developing code. Open source may be provided as binary files or libraries to be linked with a user's' project, as code files to be compiled with a user's project, as code snippets to be added and optionally edited by a user as part of a file, as any other format, or in any combination thereof.

Open source may be used for a multiplicity of reasons, such as but not limited to: saving programming and debugging time and effort by obtaining a functional verified unit; porting or programming code to an environment in which the user has insufficient experience or knowledge; adding generic options such as graphic support, printing, or the like, or other purposes. The ease of obtaining such code on the Internet has greatly increased the popularity of its usage.

Despite the many advantages, open source may also carry hazards. One such danger may relate to the need to trust code received from an external source. Such code may contain bugs, security hazards or vulnerabilities, time or space inefficiencies, or even viruses, Trojan horses, or the like.

Another problem in using open source relates to the licenses which may be associated with any open source unit. Any such license may incur specific limitations or requirements on a user or a user's project developed using the open source.

Some licenses may require copyright and notification of the license. Others may require that if a user modified the used open source, for example fixed a bug, the user shares the modified version with other users in the same manner as the original open source was shared. Further licenses may require sharing the users' code developed with the open source with other users. The extent for which sharing is required may vary between files containing open source, and the whole user project. Further requirements may even have implications on the user's clients which may use the project developed with open source.

Open source may also pose legal limitations, such as limitations on filing patent applications associated with material from the open source, the inability to sue the open source developer or distributor if it does not meet expectations, or the like.

Once the requirements associated with using an open source are known, a user may decide whether it is acceptable for him or her to comply with the requirements, take the risks, and use the open source.

However, situations exist in which it is unknown whether a program was developed using open source or not, and which open source was used. In such situations, a user does not know the risks and obligations implied by the code. Such situations may occur, for example, when a programming project is outsourced to an external entity, when a programmer left the company and did not update his colleagues, in large companies possibly employing program development teams at multiple sites, or the like.

BRIEF SUMMARY

One exemplary embodiment of the disclosed subject matter is a computer-implemented method comprising: a computer-implemented method comprising: obtaining one or more source files to be examined for open source usage; extracting partial representation of a source file from the one or more source files; creating fingerprints from the partial representation; encoding the fingerprints into characteristics; issuing a query to a database for retrieving from an open source and characteristics index one or more open source files associated with the characteristics; receiving a response including the open source files; checking whether the source file comprises a snippet from the open source files; and subject to the source file comprising the snippet, outputting an identification of the open source files. The method can further comprise: receiving an open source project comprising a multiplicity of files; for each open source file from the files: extracting an open source partial representation of the open source file; creating open source fingerprints from the open source partial representation; encoding the open source fingerprints into open source characteristics; and storing the open source characteristics and an identifier of the open source file in the database. The method can further comprise reducing the number of open source fingerprints prior to storing the fingerprints. Within the method, creating the fingerprints optionally comprises selecting code including an anchor statement from the partial representation of the source file. Within the method, the code optionally includes the anchor statement and code lines appearing immediately before or after the anchor statement within the at least one code file. Within the method, the code optionally includes the anchor statement and code lines along data flow before or after the anchor statement. Within the method, creating the fingerprints comprises selecting code that calculates data or parameters for the anchor statement. Within the method, creating the fingerprints optionally comprises selecting code snippets of a predetermined type. Within the method, the predetermined type is optionally a function. Within the method, the predetermined type is optionally selected from the group consisting of: a part of a function; a class, a method; a part of a class; and a part of a method. Within the method, checking whether the source files comprise a snippet from the one open source files optionally comprises clone detection. Within the method, the clone detection may be of level 1, 2, 3 or 4. Within the method, the clone detection optionally comprises semantic or syntactic clone detection. The method can further comprise reducing the number of fingerprints prior to encoding or storing the fingerprints.

Another exemplary embodiment of the disclosed subject matter is a computer-implemented method comprising: obtaining one or more open source files; extracting partial representation of one open source file; creating fingerprints from the partial representation; encoding the fingerprints into characteristics; storing the characteristics in an open source and characteristics index comprising the characteristics and identification of the open source file; subject to receiving a query comprising characteristics, searching within the open source and characteristics index for an open source file associated with the characteristics; and upon finding the open source file in the database, transmitting a response to the query, the response comprising the identification of the open source file. Within the method, creating the fingerprints optionally comprises selecting code including an anchor statement. Within the method, the code optionally includes: the anchor statement and code lines appearing immediately before or after the anchor statement within the at least one open source file; the anchor statement and code lines along data flow before or after the anchor statement; or code that calculates data or parameters for the anchor. Within the method, creating the fingerprints optionally comprises selecting code snippets, one or more of the code snippets comprising an element selected from the group consisting of: a function; a method; a class; a part of a function; a part of a method; and a part of a class.

Another exemplary embodiment of the disclosed subject matter is a computerized apparatus having a processor, the processor being configured to perform the steps of: obtaining one or more source files to be examined for open source usage; extracting partial representation of one source file; creating fingerprints from the partial representation; encoding the fingerprints into characteristics; issuing a query to a database for retrieving from an open source and characteristics index an open source file associated with the characteristics; receiving a response including the open source file; checking whether the source file comprises a snippet from the open source file; and subject to the source file comprising the snippet, outputting an identification of the open source file.

Yet another aspect of the disclosed subject matter is a computer program product comprising a computer readable storage medium retaining program instructions, which program instructions when read by a processor, cause the processor to perform a method comprising: obtaining a source file to be examined for open source usage; extracting partial representation of the source file; creating fingerprints from the partial representation; encoding the fingerprints into characteristics; issuing a query to a database for retrieving from an open source and characteristics index one or more open source files associated with the characteristics; receiving a response including the open source file; checking whether the source file comprises a snippet from the open source file; and subject to the source file comprising the snippet, outputting an identification of the open source file.

THE BRIEF DESCRIPTION OF THE SEVERAL VIEWS OF THE DRAWINGS

Figure 2:
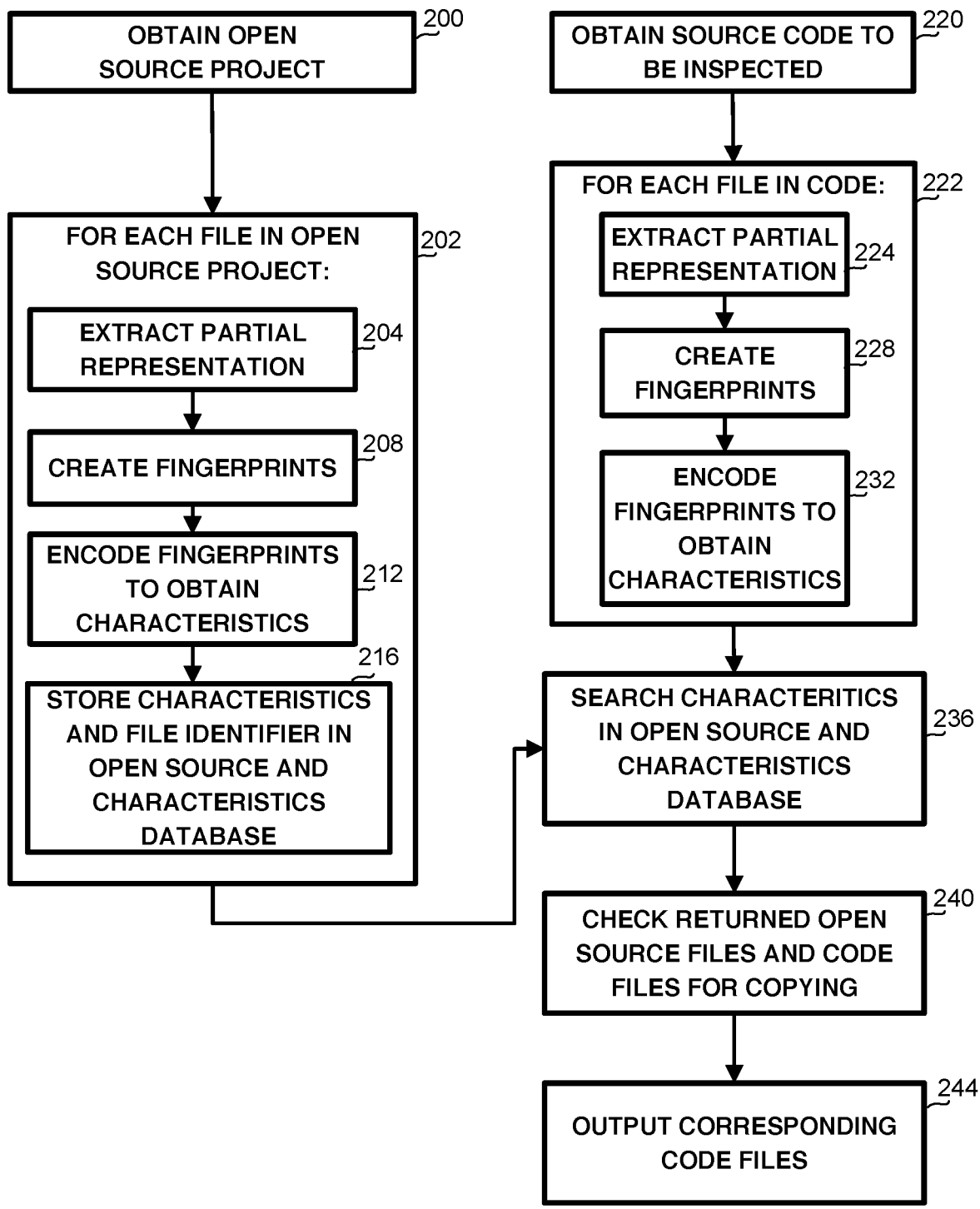

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1 shows a block diagram of a system for determining whether and which open source file is used in source code, in accordance with some exemplary embodiments of the subject matter; and FIG. 2 shows a flowchart of steps in a method for determining whether and which open source file is used in source code, in accordance with some exemplary embodiments of the subject matter.

DETAILED DESCRIPTION

One technical problem dealt with by the disclosed subject matter is the need to detect whether given source code, comprising one or more source files, comprises code segments from an open source library. The code segments may be referred to snippets. The source files comprising open source segments does not necessarily relate to whole files being copied, or to exact copying. Rather, code segments from an open source file or library may be copied by a user as is, or used as a basis upon which changes are applied. For example, changes may include adding code instructions, changing variable names or names of other entities, changing the order of the copied segments, or the like. The used code segments may be of any size, from one line or a few lines, to hundreds or thousands of code liens, or even more.

Another technical problem dealt with by the disclosed subject matter is the need to identify the specific open source file(s) or library(ies) from which code segments have been copied or otherwise used in the source files.

A significant limitation in identifying whether and which open source library is caused by the plethora of available open source libraries and even more so files. Comparing a given file, or a multiplicity of given files to millions of other files is practically impossible, especially when copying is not required to be exact, but rather changes may be applied, only segments nay be used and in any order, or other modifications.

Yet another technical problem dealt with by the disclosed subject matter is a requirement not to let user's code leave the network of an organization, even for a purpose such as open source verification. Once a source file is transmitted to another location, it becomes much more vulnerable to spying, copying, or the like. On the other hand, it is practically impossible to import all known open source files into an organization for making such checks.

One technical solution comprises a method and system for discovering open source usage. The method includes a preparatory stage in which a relatively small set of characteristics is extracted from each available open source file, wherein the characteristics may be associated with parts of the file, for example functions, rather than with the file as a whole. The characteristics may be obtained by selecting portions of the file and encoding them, thus creating one or more characteristics per file. The characteristics can then be stored, for example in a database, in a manner that enables the retrieval of a file upon one or more characteristics thereof. The characteristics are selected so as to be invariant to many possible changes, such as code segments order, variable names, or others. The characteristics may be selected upon segments which are small enough to identify copy or usage of small open source segments and not only huge ones, but are large enough, such that the amount of wrong identification (also referred to as false alarms) is manageable by the user.

The characteristics may be extracted from each open source file of each available open source library, such that a source file is checked against all available open source libraries.

When it is required to check whether a user's source code, also referred to as user's source files or simply source files, comprises open source segments, the characteristics are extracted from the source files in the same manner as described above. The characteristics may then be transmitted to a server or another computing platform having access to the database. The database may be searched for the characteristics extracted from the source files. If one or more instances of the characteristics are found in the database, the files associated with the instances are retrieved and may be provided to the user's computer or to another platform having access to the user's source files. The number of returned files generally depends on the manner in which the characteristics are extracted, which may be designed, on the average, such that the number of the returned files does not exceed a predetermined threshold, such that the files can be provided to the user's computer or network and checked in an acceptable time, for example under a predetermined threshold. The source files may then be compared to the open source files retrieved and provided, for example by a clone detector. The comparison may not refer to exact copying but rather to searching for identical or similar segments, such as segments identical except for certain characters or identifiers, segments which are similar except for additional statements, or the like. If a match is found, the name of the open source file and optionally the corresponding library it is a part of, may be provided.

One technical effect of utilizing the disclosed subject matter is the provisioning of a method and apparatus for determining the usage of open source in source files, even when the usage is not by exact copying but rather relates to smaller segments or when changes are introduced to the source files. The open source library and files that were used are identified.

Another technical effect of utilizing the disclosed subject matter is that in order to detect open source usage the source files do not need to be transmitted to a computing platform external to the organization or the user's network, and is thus less vulnerable to hazards.

Yet another technical effect of utilizing the disclosed subject matter is that after initial characteristic extraction, the characteristics may be stored rather than the open source, thus providing for compact storage. Moreover, the usage of the stored characteristics for detecting open source usage is fast and efficient, and requires less memory, time and processing resources than direct comparison.

Referring now to FIG. 1 showing a block diagram of a system for determining open source usage in user source files, in accordance with some exemplary embodiments of the subject matter.

The system may comprise one or more user computing platforms 100, which may be for example a computing platform associated with a user, such as an organization developing software, and one or more computing platforms 160 which may be a server providing open source services, such as detecting open source usage to a multiplicity of user computing platforms 100.

In some exemplary embodiments of the disclosed subject matter, computing platform 100 can comprise processor 104. Processor 104 may be a Central Processing Unit (CPU), a microprocessor, an electronic circuit, an Integrated Circuit (IC) or the like. Processor 104 may be utilized to perform computations required by the apparatus or any of it subcomponents.

In some exemplary embodiments of the disclosed subject matter, computing platform 100 can comprise an Input/Output (I/O) device 108 such as a display, a pointing device, a keyboard, a touch screen, or the like. I/O device 108 can be utilized to provide output to and receive input from a user.

Computing platform 100 may comprise a storage device 112. Storage device 112 may be a hard disk drive, a Flash disk, a Random Access Memory (RAM), a memory chip, or the like. In some exemplary embodiments, storage device 112 can retain program code operative to cause processor 104 to perform acts associated with any of the subcomponents of computing platform 100.

Storage device 112 can store, or be operatively connected to user code storage 132, storing a multiplicity of source files associated with the user, wherein it may be required to check whether one or more of the source files comprise open source snippets.

Storage device 112 can store the modules detailed below. The modules may be arranged as one or more executable files, dynamic libraries, static libraries, methods, functions, services, or the like, programmed in any programming language and under any computing environment.

Storage device 112 can store partial representation extraction module 116, for receiving a given source file and extracting a partial representation of the given source file. Partial representation extraction module 116 can omit certain parts of source file, such that at least some of the remaining parts are more likely to be identified when copied, with or without changes.

Storage device 112 can store fingerprint creation module 120, for creating a set of one or more fingerprints from the partial representation created by partial representation extraction module 116. The number of fingerprints, or the size of the code represented by each fingerprint may be selected such that each source file will comprise between a first predetermined number and a second predetermined number of fingerprints; additionally or alternatively the size of the code represented by each fingerprint may be selected to be between a first predetermined threshold and a second predetermined threshold of code lines, or the like.

Storage device 112 can store fingerprint encoding module 124, for associating a characteristic with each fingerprint, for example a hash value.

Storage device 112 can store communication module, configured for example for transmitting the characteristics associated with one or more files to server 160, and receiving from server 160 one or more open source files which share one or more characteristics with the source file.

Storage device 112 can store file comparison module 136, for comparing a given source file with one or more open source files received for example from server 160.

Storage device 112 can also comprise user interface for displaying the name or content of the open source files which are most likely to have been used in the source files. The user interface can be displayed on any output device of I/O device 108. Additionally or alternatively, the results, such as the names of the open source files or the open source files can be stored, transferred to a destination, or the like.

Server computing platform 160 can comprise processor 164. Processor 164 may be a Central Processing Unit (CPU), a microprocessor, an electronic circuit, an Integrated Circuit (IC) or the like. Processor 164 may be utilized to perform computations required by the apparatus or any of it subcomponents.

In some exemplary embodiments of the disclosed subject matter, server 160 can comprise an Input/Output (I/O) device 168 such as a display, a pointing device, a keyboard, a touch screen, or the like. I/O device 168 can be utilized to provide output to and receive input from a user.

Server 160 may comprise a storage device 172. Storage device 172 may be a hard disk drive, a Flash disk, a Random Access Memory (RAM), a memory chip, or the like. In some exemplary embodiments, storage device 172 can retain program code operative to cause processor 164 to perform acts associated with any of the subcomponents of server 160.

Storage device 172 can store, or be operatively connected to open source and characteristics index, storing a multiplicity of open source files, and for each such file, a ' of a characteristics associated therewith.

Storage device 172 can store the modules detailed below. The modules may be arranged as one or more executable files, dynamic libraries, static libraries, methods, functions, services, or the like, programmed in any programming language and under any computing environment.

Storage device 172 can store partial representation extraction module 176, for receiving a given open source file and extracting a partial representation of the given source file, similar to partial representation extraction module 116.

Storage device 172 can store fingerprints creation module 180, similar to fingerprints creation module 120.

Storage device 172 can store fingerprint encoding module 184, similar to fingerprint encoding module 124. The encoded fingerprints, comprising one or more characteristics may be stored in open source and characteristics index 182.

Storage device 172 can store fingerprint search engine 188 for receiving a collection comprising one or more characteristics and retrieving one or more open source files having at least one a characteristic in common with the given collection. In some embodiments, fingerprint search engine 188 can search open source and characteristics index 182 for the name or another locator of a file associated with at least one of the given characteristics, and then fetch the file from another storage.

Storage device 172 can store communication module 186, configured for example for receiving one or more characteristics associated with one or more source files from server 160, and providing to communication module 128 of user computing platform 100 one or more open source files which share one or more characteristics with the received characteristics.

Referring now to FIG. 2, showing a flowchart of steps in a method for determining whether and which open source files are used in source files, in accordance with some exemplary embodiments of the subject matter.

On step 200, an open source project may be obtained, which comprises one or more open source files.

On step 202, each source file in the open source project is processed as detailed below.

On step 204, partial representation of the file may be extracted, for example by partial representation extraction module 176. The extraction may comprise constructing a graph of the file, for example an abstract syntax tree (AST), by omitting certain parts of the file. For example, any one or more the following parts may be removed:

Nodes (e.g. words or identifiers) related to local identifiers;
Variables names;
Function names;
Type declarations;
Statements, for example an "import" statement.

The remaining parts may contain keywords, statements, and external identifiers.

For example, in the code segment listed in Listing 1, the comment at the end of each line indicates whether it stays or is removed, and the reason for removal:

Listing 1

```
package eclipse.jdt.ast; // removed - auxiliary statement
import org.eclipse.jdt.core.dom.AST; // removed - auxiliary statement
import org.eclipse.jdt.core.dom.ASTParser; // removed - auxiliary statement
import org.eclipse.jdt.core.dom.CompilationUnit; // removed-auxiliary statement
import java.io.BufferedReader; // removed-auxiliary statement
import java.io.FileReader; // removed-auxiliary statement
import java.io.IOException; // removed-auxiliary statement
public class JdtAstGenerator { // removed - type declaration
    public static CompilationUnit parse(String str) { //stays, parameter is omitted
        ASTParser parser = ASTParser.newParser(AST.JLS3); // stays,
                // definition and name omitted
        parser.setBindingsRecovery(true); //stays, object name omitted
        parser.setSource(str.toCharArray( )); //stays, object name omitted
        parser.setKind(ASTParser.K_COMPILATION_UNIT); //stays,
                // object name omitted
        return (CompilationUnit) parser.createAST(null); //stays,
```

Listing 1

```
        object name omitted
        }
} //removed
```

Listing 2

```
The remaining code is thus:
public static CompilationUnit ( ){
    ASTParser.newParser(AST.JLS3);
    .setBindingsRecovery(true);
    .setSource(str.toCharArray( ));
    .setKind(ASTParser.K_COMPILATION_UNIT);
    return (CompilationUnit).createAST(null);
}
```

On step 208, fingerprints may be created upon the partial representation, for example by fingerprint creation module 180. The term "fingerprints" relates to a textual segment which may be invariant to a multiplicity of changes and thus significant in determining copy, and in particular inexact copy. In order to reduce the number of fingerprints, the fingerprints may be created upon parts of the partial representation. The description below demonstrates a few approaches for creating fingerprints upon the partial representation. Some of the approaches implement also step 212, of encoding the fingerprints into characteristics, which are entities that are easily comparable, such as integer numbers.

In one approach, the fingerprints may be created upon anchors. An anchor is a string of characters which is code-wise meaningful, for example the name of an external function that is being called, a location within a code that uses open source Application Program Interfaced (API), or the like. If a file contains a piece of code (also referred to as "slice") copied from another file, and if the piece of code starts at an anchor or contains an anchor, then there is high probability that strings in the vicinity of the anchor are identical as well. The vicinity may relate to textual vicinity, e.g., lines of code preceding or following the anchor; data flow vicinity being lines executed before or after the anchor, as may be done with API calls; code that calculates data or parameters for the anchor, or the like. It will be appreciated that multiple anchors may be indicated in a file, in order to span the file in a more uniform manner than can be expected when using a single anchor.

For example, the string "new HttpPost" may be defined as an anchor. For each statement containing this string, a predetermined number of statements text-wise or call-wise before and after the statement may be retained, while the other statements may be omitted.

In the example of Listing 2 above, the fingerprint may be setBindingsRecovery setSource setKind createAST In another approach, only code snippets of a predetermined type are used. For example, only the code snippets that describe functions. Additionally, functions smaller than a first predetermined size or larger than a second predetermined size may be omitted. The omitted smaller and larger functions may call or be called by other functions and may thus be covered as well.

In yet other approaches, the fingerprint may be determined upon substrings of the partial representation of a predetermined length. However, considering all the substring may result in a tremendous number of fingerprints, thus the number may be reduced.

One such method for reducing the number of substrings is the Karp-Rabin string matching method. This method includes computing a hash value for each fingerprint, which is defined as encoding fingerprint step 212. The Karp-Rabin method may be performed as follows:

Finding occurrences of a particular string of predetermined length k within a longer string. The hash value of the i+1 k-gram (i.e. the i+1 string of length k) may be computed upon the hash value of the $i^{th}$ k-gram.

Treat a k-gram $C_1 \ldots C_k$ as a k-digit number in base b:

$$H(C_1 \ldots C_k) = C_1 * b^{\wedge}(k-1) + \ldots + C_{k-1}*b + C_k$$

The hash value of the k-gram $C_2 \ldots C_{k+1}$ may be calculated as follows:

$$H(C_2 \ldots C_{k+1}) = [H(C_1 \ldots C_k) - C_1*b^{\wedge}(k-1)]*b + C_{k+1}$$

Thus, the hash value of each subsequent substring is computed in constant time.

In yet another method for reducing the number of substrings, invariants are used. In the following description, k is a length of a substring considered, and w is a threshold, wherein k is smaller than w. K is also a threshold, such that strings shorter than k are not considered. If there is a substring match between a document D and one of the documents in the set, wherein the substring length is at least w, then this match is detected. The larger k is, the higher is the confidence that matches between documents are not coincidental. However, larger values of k also limit the sensitivity to reordering of document contents, and matches may be missed.

A further method for reducing the number of substrings may be the 0 mode p approach, described for example in "*Winnowing: Local Algorithms for Document Fingerprinting*" by Schleimer et al. published on 2003 in *SIGMOD 2003*, Jun. 9-12, 2003, San Diego, Calif. Copyright 2003 ACM 1-58113-634-X/03/06. In this approach, only a subset of the hash values are retained as the document's fingerprints. For example, only hash value that are 0 (or any other number between 0 and p-1) mod p, for some predetermined p are retained. This approach is easy to implement and retains only 1/p of all hashes as fingerprints. In order to implement this method, a window of size w is defined to be w consecutive hashes of k-grams in a document (w may be a parameter predetermined by the user). This method is known to guarantee to detect at least one k-gram in any shared substring of length at least w+k-1.

On step 212, for the approaches above that do not include encoding the fingerprints, the fingerprints are encoded into characteristics, for example by fingerprint encoding module 184. The fingerprints may be encoded, using for example a hash function calculated upon the textual segment. Each fingerprint, for example the sequence of the anchor and its preceding and following commands, may be processed to obtain a single hash value, being a characteristic.

Thus, each file is associated with one or more hash values, referred to as characteristics. The number of characteristics per file depends on the size of the graph, such as the AST, generated from the file, the upper and lower bounds on the size of the processed segments such as the functions, or the like.

Once the fingerprints are encoded, on step 216 the characteristics, with an identifier of the relevant file such as the name or location, may be stored in open source and characteristics index 182. It will be appreciated that the file itself can be stored in the database or in another storage operatively connected to the database such that files can be accessed.

Step 200, 204, 208, 212 and 216 may be performed by server 160 for each open source project obtained.

The steps detailed below, unless specifically indicated otherwise, may be performed by user computing platform 100 when it is required to check whether one or more source files contain open source segments, and which open source file or project the it is taken from. However, and specifically if transmitting the code to an external computing platform does not pose a problem, the files can be transferred to a computing platform, such as server 160, processed as detailed below by server 160 rather than by user computing platform 100, and the results may be provided back to user computing platform 100.

On step 220 the source files to be inspected may be obtained.

On step 222, each file it is required to inspect, undergoes processing which is analogous to the processing performed by server 160 to the open source files. Thus, each file may undergo partial representation extraction on step 224, analogous to step 204, fingerprint creation on step 228 analogous to step 208, and fingerprint encoding on step 232 analogous to step 212.

On step 236, the obtained characteristics may be provided to server 160 and may be searched for in open source and characteristics index 182. The search may be performed, for example, by a characteristic search engine 188, which may operate, for example, in accordance with elastic search or by any other method. Step 236 may be referred to as a rough search step, which may reduce the volume of the code that undergoes more intensive search.

The search may return a multiplicity of open source files for each source file, wherein each open source file is associated with at least one characteristic equal to one of the characteristics of the source file. Each returned file may be associated with a probability that the source file contains snippets from the returned file. Generally, the more common characteristics between a source file and an open source file, the higher is the probability that the source files contains code copied from the open source file.

On step 240, the source file and the returned open source files may be thoroughly or intensively checked for copying, for example by file comparison module 136. The files may be compared in an order corresponding to the probability associated with each open source file.

When comparing, simple string matching may not succeed in many cases, since small code snippets may be copied rather than the whole file. Additionally or alternatively, the copied snippets may possibly be altered, and additional code may be added.

Thus, several levels of cloning may be defined, and a cloning level to be checked may be selected in accordance with the needs. It will also be appreciated that clone detection can be semantic, syntactic or a combination thereof.

One cloning level may relate to identical code fragments, except for differences in white-space, layout and comments. In order to implement this level, spaces, tabs, new lines and comments may be removed from both the source file and the open source file, and common strings may be searched.

A second cloning level may search for identical code fragments, except for differences in characteristic names and literal values, in addition to the first level clone differences. In order to implement this level, identifying names and values may also be removed, and common strings may be searched for.

In a third cloning level, syntactically similar code fragments that differ at the statement level may be searched for. The fragments have statements added, modified and/or removed with respect to each other, in addition to Type-1 and Type-2 clone differences.

A fourth cloning level may search for syntactically dissimilar code fragments that implement the same functionality. One implementation for this method is described in "*SourcererCC and SourcererCC-I: Tools to Detect Clones in Batch Mode and during Software Development*", by Saini et al. presented on May 2016 at 2016 IEEE/ACM 38th International Conference on Software Engineering Companion (ICSE-C). In this approach a project P is represented as a collection of code blocks {B1, . . . , Bn}, wherein a code block B is represented as a bag-of-tokens {T1, . . . , Tk}, and wherein a token T is an AST node name, literals, or identifier. Since a code block may have repeated tokens, each token is represented as a (token; frequency) pair. If the intersection of B (the representation of the source file, and B' (the representation of the open source) exceeds a threshold, then the files are considered as cloning.

It will be appreciated that cloning levels one and two are more syntactic, while levels three and four are semantic. It will also be appreciated that a combination of two or more levels may be exercised.

On step 244, for source file that matches an open source file in accordance with the cloning level, for example beyond predetermined probability and is thus assumed to contain cloned snippets, the one or more open source files containing one or more of the snippets with the allowed changes, may be output, for example by a user interface module displaying on I/O device 108. Additionally or alternatively, the files may be transmitted or provided to any system or user.

It is noted that the teachings of the presently disclosed subject matter are not bound by the block diagram described with reference to FIG. 1. Equivalent and/or modified functionality can be consolidated or divided in another manner and can be implemented in any appropriate combination of software with firmware and/or hardware and executed on one or more suitable devices. It is also noted that the teachings of the presently disclosed subject matter are not bound by the flowchart described with reference to FIG. 2. Equivalent and/or modified steps can be consolidated or divided in another manner and can be implemented in any appropriate combination of software with firmware and/or hardware and executed on one or more suitable devices.

The system can be a standalone entity, or integrated, fully or partly, with other entities, which can be directly connected thereto or via a network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   obtaining at least one source file to be examined for open source usage;
   extracting partial representation of the source file;
   creating fingerprints from the partial representation;
   encoding the fingerprints into characteristics;
   issuing a query to a database for retrieving from an open source and characteristics index at least one open source file associated with the characteristics;
   receiving a response including the at least one open source file;
   checking whether the at least one source file comprises a snippet from the at least one open source file; and
   subject to the at least one source file comprising the snippet, outputting an identification of the at least one open source file.

2. The method of claim 1 further comprising:
   receiving an open source project comprising a multiplicity of files;
   for each open source file from the files:
      extracting an open source partial representation of the open source file;
      creating open source fingerprints from the open source partial representation;
      encoding the open source fingerprints into open source characteristics; and
      storing the open source characteristics and an identifier of the open source file in the database.

3. The method of claim 2 further comprising reducing the number of open source fingerprints prior to storing the fingerprints.

4. The method of claim 1 wherein creating the fingerprints comprises selecting code including an anchor statement from the partial representation of the source file.

5. The method of claim 4 wherein the code includes the anchor statement and code lines appearing immediately before or after the anchor statement within the at least one code file.

6. The method of claim 4 wherein the code includes the anchor statement and code lines along data flow before or after the anchor statement.

7. The method of claim 1 wherein creating the fingerprints comprises selecting code that calculates data or parameters for the anchor statement.

8. The method of claim 1 wherein creating the fingerprints comprises selecting code snippets of a predetermined type.

9. The method of claim 8 wherein the predetermined type is a function.

10. The method of claim 8 wherein the predetermined type is selected from the group consisting of: a part of a function; a class, a method; a part of a class; and a part of a method.

11. The method of claim 1 wherein checking whether the at least one source file comprises a snippet from the at least one open source file comprises clone detection.

12. The method of claim 11 wherein the clone detection is of level 1, 2, 3 or 4.

13. The method of claim 11 wherein the clone detection comprises semantic or syntactic clone detection.

14. The method of claim 1 further comprising reducing the number of fingerprints prior to encoding or storing the fingerprints.

15. A computer-implemented method comprising:
   obtaining at least one open source file;
   extracting partial representation of the at least one open source file;
   creating fingerprints from the partial representation;
   encoding the fingerprints into characteristics;
   storing the characteristics in an open source and characteristics index comprising the characteristics and identification of the at least one open source file;
   subject to receiving a query comprising characteristics, searching within the open source and characteristics index for an open source file associated with the characteristics; and
   upon finding the open source file in the database, transmitting a response to the query, the response comprising the identification of the open source file.

16. The method of claim 15 wherein creating the fingerprints comprises selecting code including an anchor statement.

17. The method of claim 16 wherein the code includes: the anchor statement and code lines appearing immediately before or after the anchor statement within the at least one open source file; the anchor statement and code lines along data flow before or after the anchor statement; or code that calculates data or parameters for the anchor.

18. The method of claim 15 wherein creating the fingerprints comprises selecting code snippets, at least one of the code snippets comprising an element selected from the group consisting of: a function; a method; a class; a part of a function; a part of a method; and a part of a class.

19. A computerized apparatus having a processor, the processor being configured to perform the steps of:
  obtaining at least one source file to be examined for open source usage;
  extracting partial representation of the at least one source file;
  creating fingerprints from the partial representation;
  encoding the fingerprints into characteristics;
  issuing a query to a database for retrieving from an open source and characteristics index at least one open source file associated with the characteristics;
  receiving a response including the at least one open source file;
  checking whether the at least one source file comprises a snippet from the at least one open source file; and
  subject to the at least one source file comprising the snippet, outputting an identification of the at least one open source file.

20. A computer program product comprising a computer readable storage medium retaining program instructions, which program instructions when read by a processor, cause the processor to perform a method comprising:
  obtaining at least one source file to be examined for open source usage;
  extracting partial representation of the source file;
  creating fingerprints from the partial representation;
  encoding the fingerprints into characteristics;
  issuing a query to a database for retrieving from an open source and characteristics index at least one open source file associated with the characteristics;
  receiving a response including the at least one open source file;
  checking whether the at least one source file comprises a snippet from the at least one open source file; and
  subject to the at least one source file comprising the snippet, outputting an identification of the at least one open source file.

* * * * *